US012087497B2

(12) United States Patent
Ohkubo et al.

(10) Patent No.: US 12,087,497 B2
(45) Date of Patent: Sep. 10, 2024

(54) ELECTRONIC COMPONENT

(71) Applicant: TDK CORPORATION, Tokyo (JP)

(72) Inventors: Hitoshi Ohkubo, Tokyo (JP); Kenei Onuma, Tokyo (JP); Masazumi Arata, Tokyo (JP); Masataro Saito, Tokyo (JP); Kohei Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 456 days.

(21) Appl. No.: 17/094,433

(22) Filed: Nov. 10, 2020

(65) Prior Publication Data

US 2021/0151248 A1 May 20, 2021

(30) Foreign Application Priority Data

Nov. 15, 2019 (JP) ................................ 2019-207239

(51) Int. Cl.

| | |
|---|---|
| ***H01F 5/00*** | (2006.01) |
| ***H01F 27/28*** | (2006.01) |
| ***H01F 27/29*** | (2006.01) |
| ***H01F 27/32*** | (2006.01) |
| *H01F 27/255* | (2006.01) |

(52) U.S. Cl.

CPC ....... *H01F 27/323* (2013.01); *H01F 27/2804* (2013.01); *H01F 27/29* (2013.01); *H01F 27/255* (2013.01); *H01F 2027/2809* (2013.01)

(58) Field of Classification Search

CPC .................................................. H01F 27/2804
USPC .......................................................... 336/200
See application file for complete search history.

(56) References Cited

U.S. PATENT DOCUMENTS

| | | | | |
|---|---|---|---|---|
| 2016/0042857 | A1* | 2/2016 | Chun | H01F 17/04 336/200 |
| 2016/0268038 | A1 | 9/2016 | Choi | |
| 2017/0323725 | A1 | 11/2017 | Iso et al. | |
| 2018/0096778 | A1* | 4/2018 | Yatabe | H01G 4/30 |
| 2018/0182537 | A1* | 6/2018 | Shimizu | H01F 27/29 |
| 2019/0180909 | A1 | 6/2019 | Shinohara et al. | |
| 2019/0259526 | A1 | 8/2019 | Cho et al. | |
| 2019/0311841 | A1* | 10/2019 | Watanabe | H01F 41/06 |
| 2019/0326041 | A1 | 10/2019 | Kawaguchi et al. | |
| 2021/0098184 | A1* | 4/2021 | Okuizumi | H01F 41/0246 |

FOREIGN PATENT DOCUMENTS

| | | |
|---|---|---|
| JP | 2006-147790 A | 6/2006 |
| JP | 2012-119373 A | 6/2012 |
| JP | 2014-036149 A | 2/2014 |

(Continued)

OTHER PUBLICATIONS

English translation of CN1178232 (Year: 2004).*

*Primary Examiner* — Ronald Hinson
(74) *Attorney, Agent, or Firm* — Oliff PLC

(57) ABSTRACT

In a coil component, a main body portion is made of a metal magnetic powder-containing resin, and thus a resin component appears on end surfaces of the main body portion. In addition, since external terminal electrodes are made of a conductive resin, a resin component also appears on the surfaces of the external terminal electrodes. Accordingly, insulating coating layers are integrally covered with high adhesion with the end surfaces of the main body portion and the external terminal electrodes by the insulating coating layers coming into contact with the end surfaces of the main body portion so as to straddle the external terminal electrodes.

3 Claims, 6 Drawing Sheets

(56) References Cited

FOREIGN PATENT DOCUMENTS

| | | | |
|---|---|---|---|
| JP | 2019-106482 | A | 6/2019 |
| JP | 2019-145840 | A | 8/2019 |
| JP | 2019-192748 | A | 10/2019 |

* cited by examiner

ELECTRONIC COMPONENT

CROSS-REFERENCE TO RELATED APPLICATIONS

This application is based upon and claims the benefit of priority from Japanese Patent Application No. 2019-207239, filed on 15 Nov. 2019, the entire contents of which are incorporated herein by reference.

TECHNICAL FIELD

The present disclosure relates to an electronic component.

BACKGROUND

An electronic component according to the related art is disclosed in, for example, Japanese Unexamined Patent Publication No. 2014-36149. The electronic component includes a terminal electrode including a baking layer baked on an end surface of a ceramic element body and an insulating coating layer provided so as to cover the terminal electrode. With such an electronic component, it is possible to suppress a solder fillet at a time of surface mounting being formed on the element body end surface side.

SUMMARY

The inventors have repeated research on an insulating coating layer that suppresses solder fillet formation and have newly found a technique with which the adhesion of the insulating coating layer to an element body can be enhanced.

An object of the present disclosure is to provide an electronic component in which the adhesion between an element body and an insulating coating layer is improved.

An electronic component according to one aspect of the present disclosure includes an element body, wiring is provided in the element body, a terminal electrode provided on a surface of the element body and electrically connected to the wiring, and an insulating coating layer covering the terminal electrode. The element body is made of a metal magnetic powder-containing resin and has a mounting surface facing a mounting substrate and a rectangular end surface extending in a direction intersecting with the mounting surface. The terminal electrode is made of a conductive resin and continuously covers the mounting surface and the end surface of the element body. The terminal electrode is separated from all three sides other than a side corresponding to the mounting surface and a U-shaped exposed region where the end surface is exposed from the terminal electrode is formed on the end surface. The insulating coating layer is made of a resin material and integrally covers the terminal electrode and the exposed region on the end surface.

In the electronic component described above, the element body is made of a metal magnetic powder-containing resin, and thus a resin component appears on the end surface of the element body. In addition, since the terminal electrode is made of a conductive resin, a resin component also appears on the surface of the terminal electrode. Accordingly, the insulating coating layer is integrally covered with high adhesion with the end surface of the element body and the terminal electrode by the insulating coating layer made of a resin material coming into contact with the end surface of the element body so as to straddle the terminal electrode.

In the electronic component according to another aspect, a surface roughness of the end surface of the element body is larger than a surface roughness of the terminal electrode. In this case, high adhesion can be realized between the insulating coating layer and the end surface of the element body and peeling from the terminal electrode covered so as to be straddled is suppressed.

In the electronic component according to another aspect, a thickness of the insulating coating layer at an intermediate position of a height position of the element body with respect to the mounting surface is smaller than thicknesses at upper- and lower-side positions with respect to the intermediate position.

Provided according to the present disclosure is an electronic component in which the adhesion between an element body and an insulating coating layer is improved.

DETAILED DESCRIPTION

Figure 1:
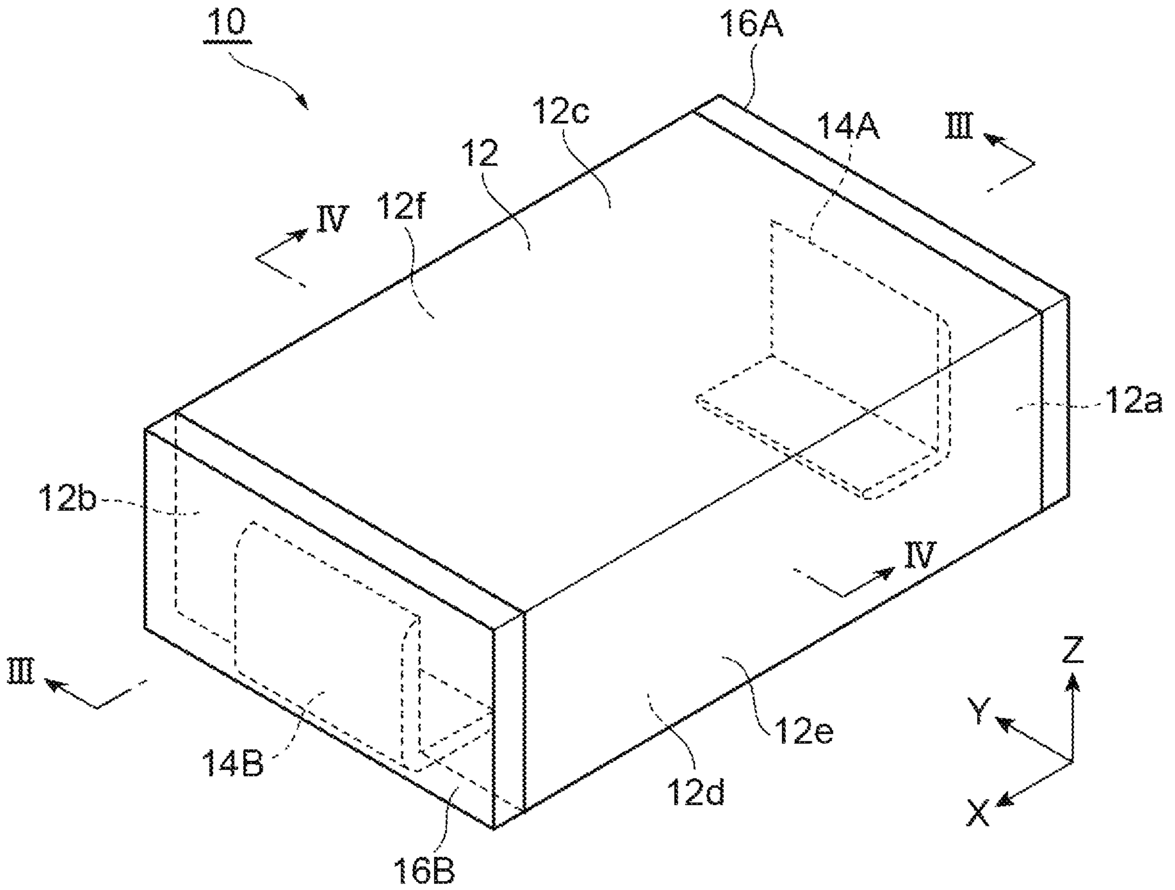
FIG. 1 is a schematic perspective view of an electronic component according to an embodiment.

Hereinafter, an embodiment of the present disclosure will be described in detail with reference to the accompanying drawings. In the description, the same reference numerals are used for the same elements or elements having the same function and redundant description is omitted.

The structure of a coil component, which is a type of electronic component, will be described as an electronic component according to the embodiment with reference to FIGS. 1 to 4. For convenience of explanation, XYZ coordinates are set as illustrated in the drawings. In other words, the thickness direction of the coil component is set as the Z direction, the facing direction of external terminal electrodes is set as the X direction, and the direction that is orthogonal to the Z direction and the X direction is set as the Y direction.

A coil component 10 is a flat coil element and includes a main body portion 12 (element body) having a rectangular parallelepiped shape, a pair of external terminal electrodes 14A and 14B provided on the surface of the main body portion 12, and a pair of insulating coating layers 16A and 16B covering the external terminal electrodes 14A and 14B. The main body portion 12 has a pair of rectangular end surfaces 12*a* and 12*b* facing each other in the X direction, a pair of rectangular main surfaces 12*c* and 12*d* facing each other in the Z direction, and a pair of rectangular side surfaces 12*e* and 12*f* facing each other in the Y direction. As an example, the coil component 10 is designed to have a long-side dimension of 2.5 mm, a short-side dimension of 2.0 mm, and a height dimension of 0.8 to 1.0 mm.

The main body portion 12 is configured to include an insulating substrate 20, a coil C provided on the insulating substrate 20, and a magnetic body 26. More specifically, the coil C (wiring) is provided in the main body portion 12 including the magnetic body 26.

The insulating substrate 20 is a plate-shaped member made of a non-magnetic insulating material and has a substantially elliptical ring shape when viewed from the thickness direction of the insulating substrate 20. An elliptical through hole 20*c* is provided at the middle part of the insulating substrate 20. A substrate in which a glass cloth is impregnated with an epoxy-based resin and that has a plate thickness of 10 μm to 60 μm can be used as the insulating substrate 20. It should be noted that BT resin, polyimide, aramid, and so on can also be used in addition to the epoxy-based resin. Ceramic or glass can also be used as the material of the insulating substrate 20. A mass-produced printed board material may be the material of the insulating substrate 20, in particular, a resin material used for a BT, FR4, or FR5 printed board.

The coil C has a first coil portion 22A where a first conductor pattern 23A for a flat air-core coil provided on one surface 20*a* (upper surface in FIG. 2) of the insulating substrate 20 is insulated and coated, a second coil portion 22B where a second conductor pattern 23B for a flat air-core coil provided on the other surface 20*b* (lower surface in FIG. 2) of the insulating substrate 20 is insulated and coated, and a through hole conductor 25 connecting the first conductor pattern 23A and the second conductor pattern 23B.

Figure 2:
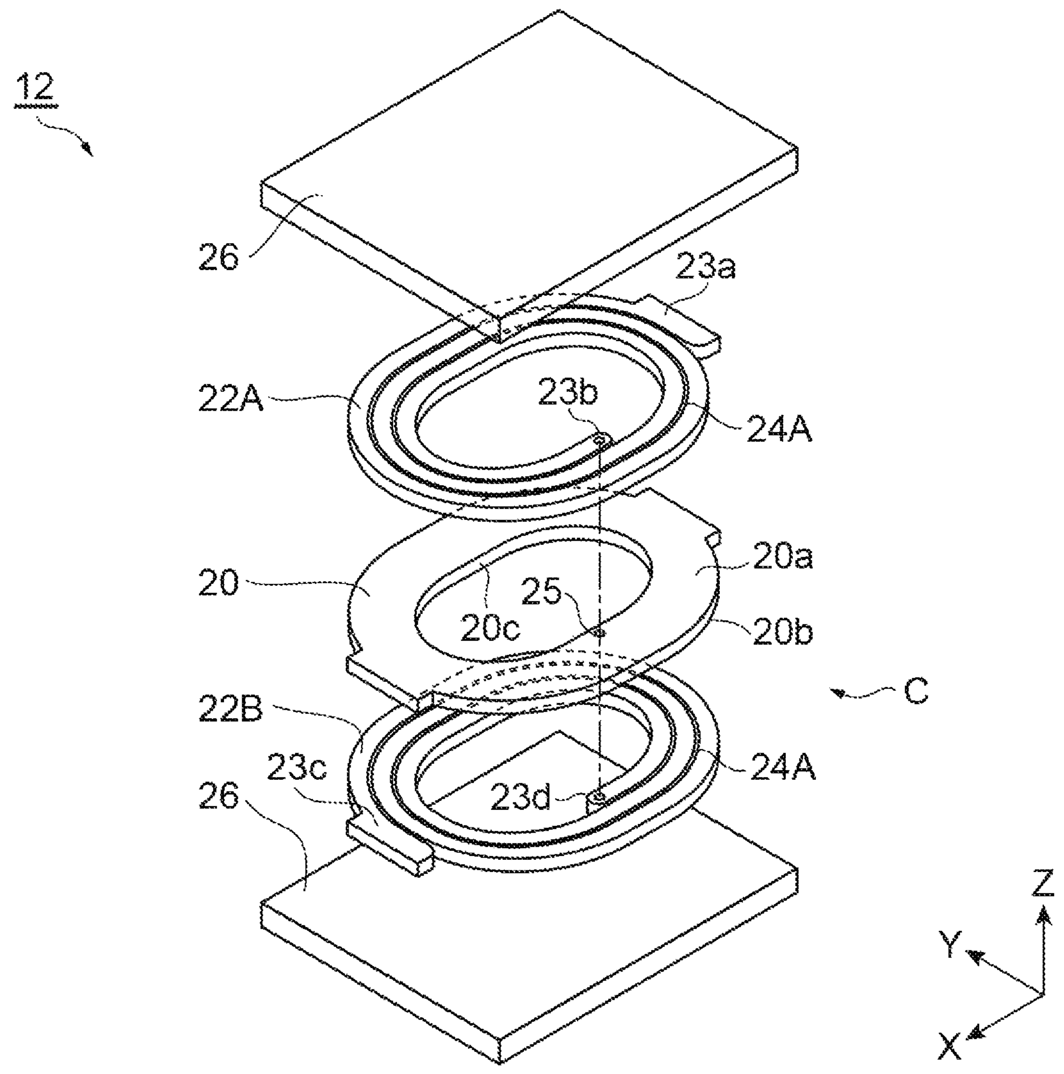
FIG. 2 is an exploded view of the electronic component illustrated in FIG. 1.

The first conductor pattern 23A (first planar coil pattern) is a planar spiral pattern serving as a flat air-core coil and is plating-formed of a conductor material such as Cu. The first conductor pattern 23A is formed so as to be wound around the through hole 20*c* of the insulating substrate 20. More specifically, as illustrated in FIG. 2, the first conductor pattern 23A is wound clockwise, by three turns, and toward the outside when viewed from the upward direction (Z direction). The height of the first conductor pattern 23A (length in the thickness direction of the insulating substrate 20) is the same over the entire length.

An outside end portion 23*a* of the first conductor pattern 23A is exposed on the end surface 12*a* of the main body portion 12 and is connected to the external terminal electrode 14A covering the end surface 12*a*. An inside end portion 23*b* of the first conductor pattern 23A is connected to the through hole conductor 25.

As in the case of the first conductor pattern 23A, the second conductor pattern 23B (second planar coil pattern) is a planar spiral pattern serving as a flat air-core coil and is plating-formed of a conductor material such as Cu. The second conductor pattern 23B is also formed so as to be wound around the through hole 20*c* of the insulating substrate 20. More specifically, the second conductor pattern 23B is wound counterclockwise, by three turns, and toward the outside when viewed from the upward direction (Z direction). In other words, the second conductor pattern 23B is wound in the direction that is opposite to the winding direction of the first conductor pattern 23A when viewed from the upward direction. The height of the second conductor pattern 23B is the same over the entire length and can be designed to be the same as the height of the first conductor pattern 23A.

An outside end portion 23*c* of the second conductor pattern 23B is exposed on the end surface 12*b* of the main body portion 12 and is connected to the external terminal electrode 14B covering the end surface 12*b*. An inside end portion 23*d* of the second conductor pattern 23B is aligned with the inside end portion 23*b* of the first conductor pattern 23A in the thickness direction of the insulating substrate 20 and is connected to the through hole conductor 25.

The through hole conductor 25 is provided through the edge region of the through hole 20*c* of the insulating substrate 20 and connects the end portion 23*b* of the first conductor pattern 23A and the end portion 23*d* of the second conductor pattern 23B. The through hole conductor 25 may include a hole provided in the insulating substrate 20 and a conductive material (for example, a metal material such as Cu) with which the hole is filled. The through hole conductor 25 has a substantially cylindrical or substantially prismatic outer shape extending in the thickness direction of the insulating substrate 20.

Figure 3:
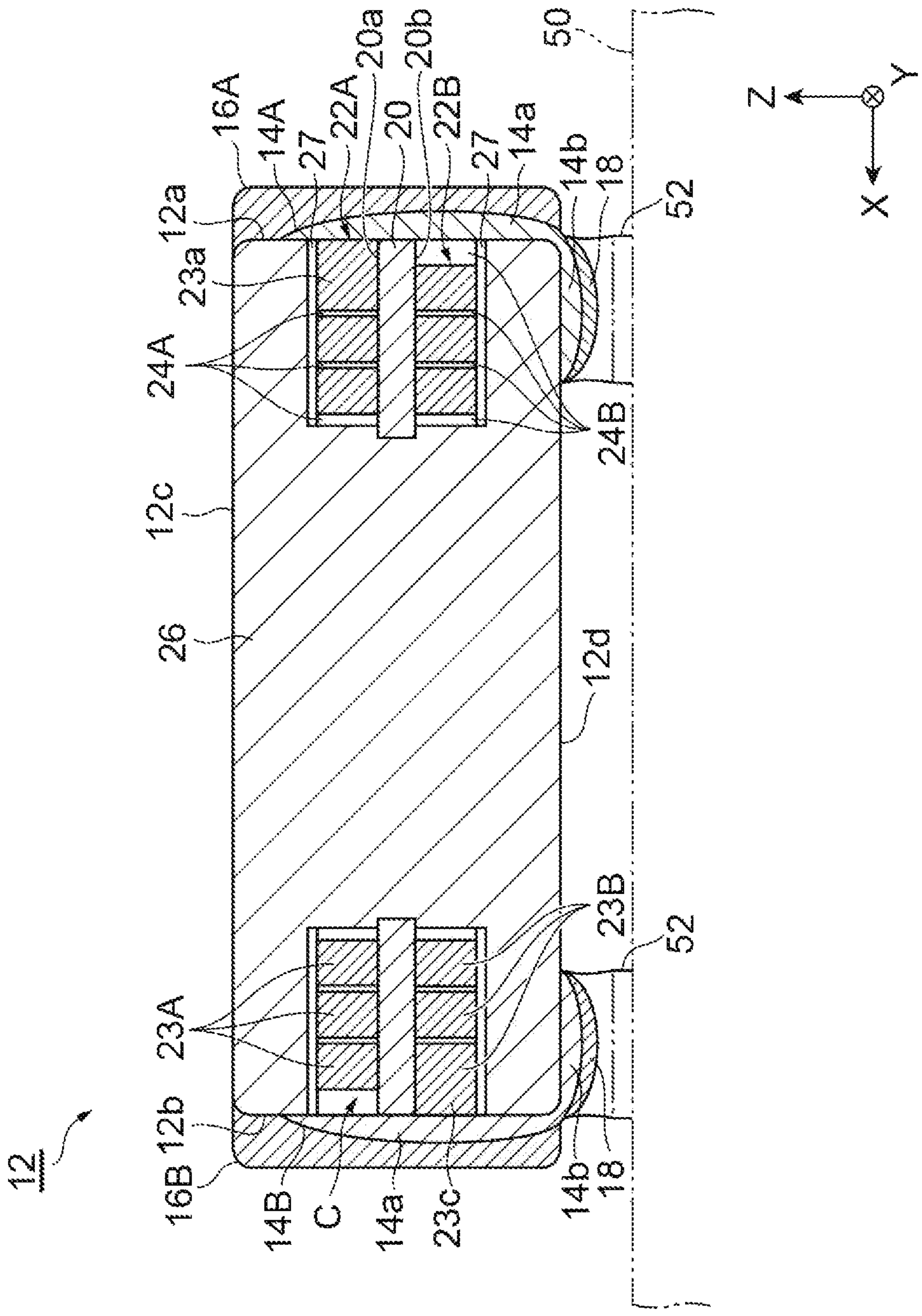
FIG. 3 is a cross-sectional view taken along line III-III of the electronic component illustrated in FIG. 1.
Figure 4:
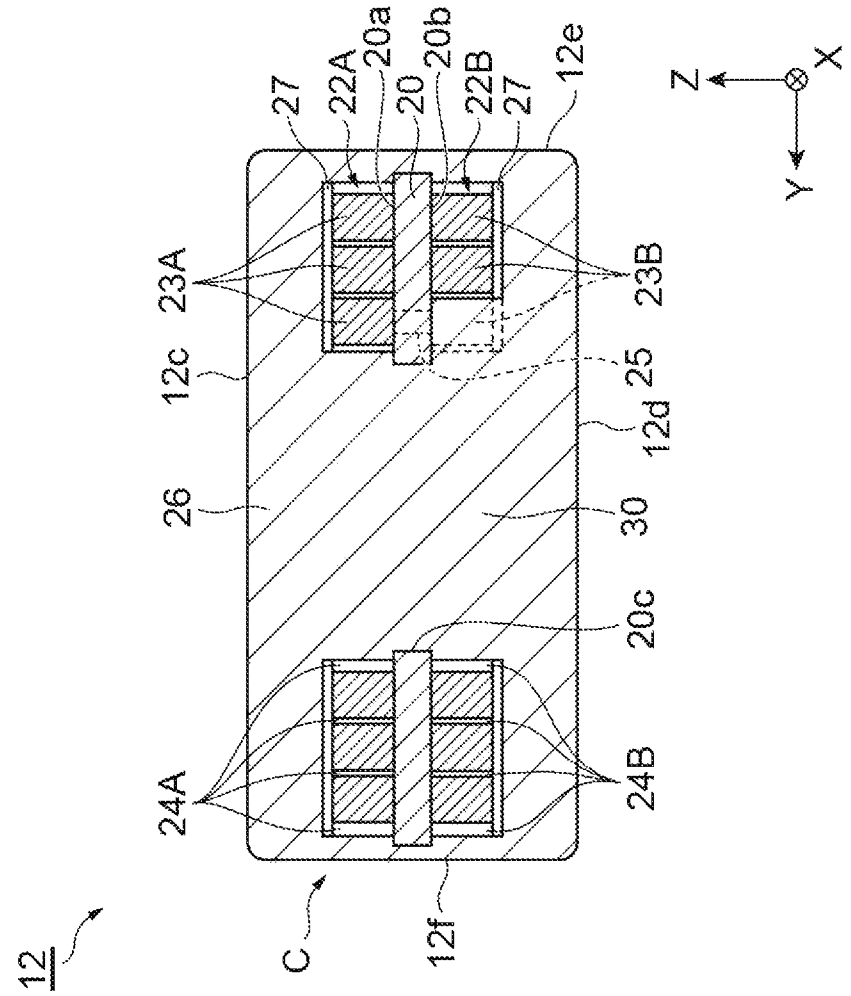
FIG. 4 is a cross-sectional view taken along line IV-IV of the electronic component illustrated in FIG. 1.

In addition, as illustrated in FIGS. 3 and 4, the first coil portion 22A and the second coil portion 22B have resin walls 24A and 24B, respectively. The resin wall 24A of the first coil portion 22A is positioned between the lines and on the inner circumference and the outer circumference of the first conductor pattern 23A. Likewise, the resin wall 24B of the second coil portion 22B is positioned between the lines and on the inner circumference and the outer circumference of the second conductor pattern 23B. In the present embodiment, the resin walls 24A and 24B that are positioned on the inner and outer circumferences of the conductor patterns 23A and 23B are designed to be thicker than the resin walls 24A and 24B that are positioned between the lines of the conductor patterns 23A and 23B.

The resin walls 24A and 24B are made of an insulating resin material. The resin walls 24A and 24B can be provided on the insulating substrate 20 before the first conductor pattern 23A and the second conductor pattern 23B are formed. In this case, the first conductor pattern 23A and the second conductor pattern 23B are plated and grown between the walls that are defined in the resin walls 24A and 24B. The resin walls 24A and 24B can be provided on the insulating substrate 20 after the first conductor pattern 23A and the second conductor pattern 23B are formed. In this case, the resin walls 24A and 24B are provided on the first conductor pattern 23A and the second conductor pattern 23B by filling, coating, or the like.

Each of the first coil portion 22A and the second coil portion 22B has an insulating layer 27, which integrally covers the first conductor pattern 23A and the second conductor pattern 23B and the resin walls 24A and 24B from the upper surface side. The insulating layer 27 may be made of an insulating resin or an insulating magnetic material. The insulating layer 27 is interposed between the magnetic body 26 and the conductor pattern 23A of the first coil portion 22A and the conductor pattern 23B of the second coil portion 22B and enhances the insulation between the conductor patterns 23A and 23B and the metal magnetic powder contained in the magnetic body 26.

The magnetic body 26 integrally covers the insulating substrate 20 and the coil C. More specifically, the magnetic body 26 covers the insulating substrate 20 and the coil C from the upward-downward directions and covers the outer circumference of the insulating substrate 20 and the coil C. In addition, the inner portion of the through hole 20*c* of the insulating substrate 20 and the inside region of the coil C are filled with the magnetic body 26. The magnetic body 26 constitutes all the surfaces of the main body portion 12, that is, the end surfaces 12*a* and 12*b*, the main surfaces 12*c* and 12*d*, and the side surfaces 12*e* and 12*f*.

The magnetic body 26 is made of a resin containing metal magnetic powder. The metal magnetic powder-containing resin is binder powder in which the metal magnetic powder is bound by a binder resin. The metal magnetic powder of the metal magnetic powder-containing resin constituting the magnetic body 26 is configured to include magnetic powder containing at least Fe (for example, iron-nickel alloy (permalloy alloy), carbonyl iron, amorphous, non-crystalline, or crystalline FeSiCr-based alloy, and sendust). The binder resin is, for example, a thermosetting epoxy resin. In the present embodiment, the content of the metal magnetic powder in the binder powder is 80 to 92 vol % by volume and 95 to 99 wt % by mass. From the viewpoint of magnetic properties, the content of the metal magnetic powder in the binder powder may be 85 to 92 vol % by volume and 97 to 99 wt % by mass. The magnetic powder of the metal magnetic powder-containing resin constituting the magnetic body 26 may be powder having one type of average particle diameter or may be mixed powder having a plurality of types of average particle diameters.

In a case where the metal magnetic powder of the metal magnetic powder-containing resin constituting the magnetic body 26 is mixed powder, the types and Fe composition ratios of the magnetic powders having different average particle diameters may be the same or different. As an example, in the case of mixed powder having three types of average particle diameters, the particle diameter of the magnetic powder having the maximum average particle diameter (large-diameter powder) can be 15 to 30 μm, the particle diameter of the magnetic powder having the minimum average particle diameter (small-diameter powder) can be 0.3 to 1.5 μm, and the magnetic powder having an average particle diameter between the large-diameter powder and the small-diameter powder (intermediate powder) can be 3 to 10 μm. With respect to 100 parts by weight of the mixed powder, the large-diameter powder may be contained in the range of 60 to 80 parts by weight, the medium-diameter powder may be contained in the range of 10 to 20 parts by weight, and the small-diameter powder may be contained in the range of 10 to 20 parts by weight.

The average particle diameter of the magnetic powder is defined by the particle diameter at an integrated value of 50% in the particle size distribution (d50, so-called median diameter) and is obtained as follows. A scanning electron microscope (SEM) photograph of a cross section of the magnetic body 26 is taken. Image processing is performed on the SEM photograph by software, the boundary of the magnetic powder is determined, and the area of the magnetic powder is calculated. The particle diameter is calculated by the calculated area of the magnetic powder being converted into a circle-equivalent diameter. For example, the particle diameter of 100 or more magnetic powders is calculated and the particle size distribution of these magnetic powders is obtained. The average particle diameter d50 is the particle diameter at an integrated value of 50% in the obtained particle size distribution. The particle shape of the magnetic powder is not particularly limited.

Figure 5:
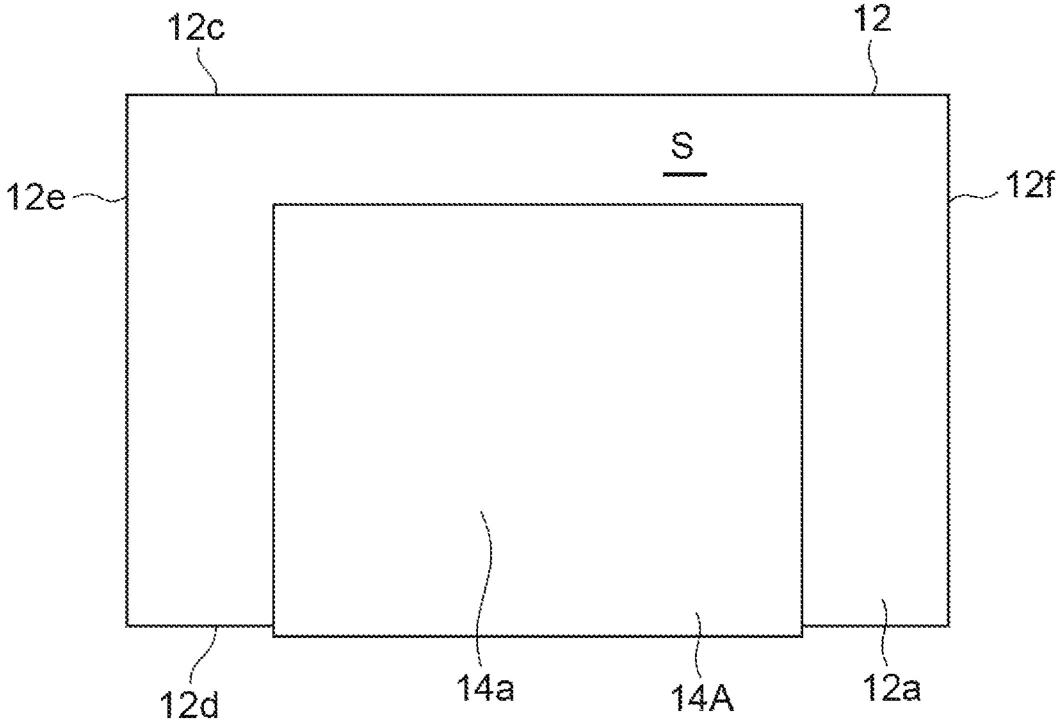
FIG. 5 is a diagram illustrating a region where an external terminal electrode is formed on an end surface of a main body portion.
Figure 6:
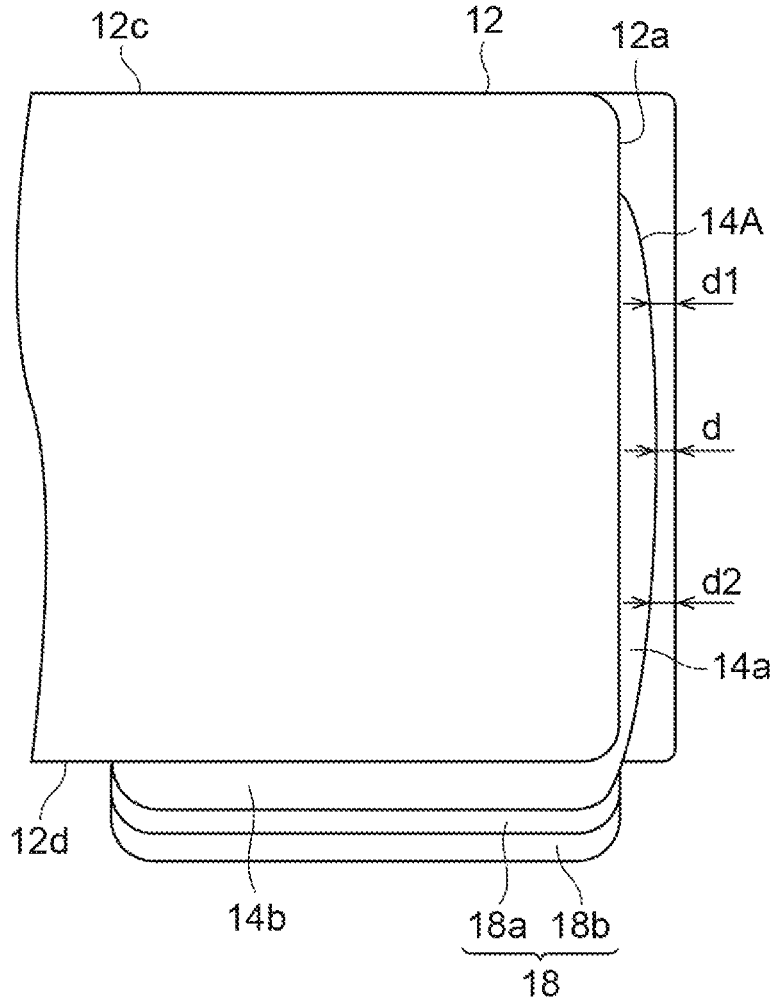
FIG. 6 is a cross-sectional view illustrating a cross section of the external terminal electrode and an insulating coating layer.

As illustrated in FIGS. 3, 5, and 6, the external terminal electrodes 14A and 14B have a first part 14*a* provided on the end surfaces 12*a* and 12*b* and a second part 14*b* provided on the main surface 12*d*, which is a mounting surface facing a mounting substrate 50, and continuously cover the end surfaces 12*a* and 12*b* and the main surface 12*d*. The external terminal electrodes 14A and 14B have an L shape in a cross section (X-Z cross section) orthogonal to the end surfaces 12*a* and 12*b* and the main surface 12*d*.

The external terminal electrodes 14A and 14B are electrically connected to the coil C provided in the main body portion 12 (specifically, the outside end portions 23*a* and 23*c* of the conductor patterns 23A and 23B) at the first part 14*a*. The second part 14*b* is a part that is solder-connected to a terminal 52 of the mounting substrate 50, and a plating layer 18 is formed on the surface of the second part 14*b*. The plating layer 18 may include a single layer or may include a plurality of layers. As illustrated in FIG. 6, in the present embodiment, the plating layer 18 includes two layers in which a Ni plating layer 18*a* and a Sn plating layer 18*b* are arranged from the side that is close to the external terminal electrode. It should be noted that the plating layer 18 is not formed at the first part 14*a* and the first part 14*a* and the insulating coating layer 16A are in direct contact with each other.

The external terminal electrode 14A has a substantially rectangular shape on the end surface 12*a* as illustrated in FIG. 5. The external terminal electrode 14A wraps around the main surface 12*d* on the side corresponding to the main surface 12*d* on the rectangular end surface 12*a* and is separated from all three sides other than the side corresponding to the main surface 12*d* (that is, the side corresponding to the main surface 12*c* and the sides corresponding to the side surfaces 12*e* and 12*f*). Accordingly, a U-shaped exposed region S where the end surface 12*a* is exposed from the external terminal electrode 14A is formed on the end surface 12*a*. The other external terminal electrode 14B also covers the end surface 12*b* in the same manner as the external terminal electrode 14A.

The external terminal electrodes 14A and 14B are electrodes (so-called resin electrodes) made of a conductive resin in which conductor powder is dispersed in the resin. Metal powder such as Ag powder can be used as the conductor powder constituting the external terminal electrodes 14A and 14B. An epoxy-based resin can be used as the resin constituting the external terminal electrodes 14A and 14B.

The external terminal electrodes 14A and 14B have a surface roughness (arithmetic mean roughness Ra) of, for example, 3 μm. The surface roughness of the end surfaces 12*a* and 12*b* of the main body portion 12 is, for example, 10 μm and is designed to be larger than the surface roughness of the external terminal electrodes 14A and 14B.

The insulating coating layers 16A and 16B cover the end surfaces 12*a* and 12*b* as illustrated in FIGS. 1, 3, and 6. Specifically, the end surfaces 12*a* and 12*b* and the external terminal electrodes 14A and 14B at the parts provided on the end surfaces 12*a* and 12*b* are integrally covered. The U-shaped exposed region S is formed on the end surfaces 12*a* and 12*b* as described above, and the insulating coating layers 16A and 16B are in contact with the end surfaces 12*a* and 12*b* so as to straddle the external terminal electrodes 14A and 14B.

As illustrated in FIG. 6, the thicknesses of the insulating coating layers 16A and 16B are not uniform. Specifically, a thickness d at the intermediate position of the height (Z-direction height) of the main body portion 12 with respect to the main surface 12*d* is designed to be smaller than a thickness d1 at the upper-side position and a thickness d2 at the lower-side position with respect to the intermediate position. It should be noted that the insulating coating layers 16A and 16B may have a uniform thickness in another aspect.

The insulating coating layers 16A and 16B are made of a resin material. Specifically, the insulating coating layers 16A and 16B are made of a thermosetting resin and can be made of epoxy resin, phenol resin, melamine resin, or the like.

In the coil component 10 described above, the main body portion 12 is made of a metal magnetic powder-containing resin, and thus a resin component (for example, epoxy-based resin) appears on the end surfaces 12*a* and 12*b* of the main body portion 12. In addition, since the external terminal electrodes 14A and 14B are made of a conductive resin, a resin component (for example, epoxy-based resin) also appears on the surfaces of the external terminal electrodes 14A and 14B. Accordingly, the insulating coating layers 16A and 16B are integrally covered with high adhesion with the end surfaces 12*a* and 12*b* of the main body portion 12 and the external terminal electrodes 14A and 14B by, for example, the insulating coating layers 16A and 16B made of an epoxy-based resin coming into contact with the end surfaces 12*a* and 12*b* of the main body portion 12 so as to straddle the external terminal electrodes 14A and 14B. Accordingly, with the coil component 10, an improvement in the adhesion between the main body portion 12 and the insulating coating layers 16A and 16B is realized.

In addition, in the coil component 10, the surface roughness of the end surfaces 12*a* and 12*b* of the main body portion 12 is larger than the surface roughness of the external terminal electrodes 14A and 14B, and thus high adhesion is realized between the insulating coating layers 16A and 16B and the end surfaces 12*a* and 12*b* of the main body portion 12 and peeling from the external terminal electrodes 14A and 14B covered so as to be straddled by the insulating coating layers 16A and 16B is suppressed.

Further, in the coil component 10, no plating layer is interposed between the insulating coating layers 16A and 16B and the external terminal electrodes 14A and 14B and the insulating coating layers 16A and 16B are in direct contact with the external terminal electrodes 14A and 14B. Accordingly, solder is unlikely to crawl up between the external terminal electrodes 14A and 14B and the insulating coating layers 16A and 16B.

It should be noted that the present disclosure is not limited to the above-described embodiment and may take various aspects. For example, the coil C may include both the first coil portion and the second coil portion or may include only the first coil portion. In addition, the end surface of the element body does not necessarily have to be orthogonal to the mounting surface and may extend in a direction intersecting with the mounting surface. Further, the electronic component is not limited to the coil component in which the coil is provided in the main body portion and may be, for example, a capacitor or a resistor.

What is claimed is:

1. An electronic component comprising:

an element body, wiring being provided in the element body;

a terminal electrode provided on a surface of the element body and electrically connected to the wiring; and an insulating coating layer covering the terminal electrode, wherein the element body is made of a metal magnetic powder-containing resin and has a mounting surface facing a mounting substrate and a rectangular end surface extending in a height direction intersecting with the mounting surface, the terminal electrode is made of a conductive resin and continuously covers the mounting surface and the end surface of the element body, the terminal electrode is separated from all three sides other than a side corresponding to the mounting surface and a U-shaped exposed region where the end surface is exposed from the terminal electrode is formed on the end surface, the insulating coating layer is made of a resin material and integrally covers the terminal electrode and the exposed region on the end surface, and a thickness of the insulating coating layer on the end surface of the element body is not uniform such that a thickness of the insulating coating layer at an intermediate position along the height direction is smaller than: (i) a thickness of the insulating coating layer at a first position in between the intermediate position and the mounting surface along the height direction and (ii) a thickness of the insulating coating layer at a second position on an opposite side of the intermediate position with respect to the first position along the height direction.

2. The electronic component according to claim 1, wherein a surface roughness of the end surface of the element body is larger than a surface roughness of the terminal electrode.

3. The electronic component according to claim 1, wherein the terminal electrode is arranged outward with respect to an entirety of the end surface and an entirety of the mounting surface of the element body.

* * * * *